United States Patent [19]

Yoshimura

[11] Patent Number: 5,825,649

[45] Date of Patent: Oct. 20, 1998

[54] KERNEL SUBSTITUTION METHOD IN MULTI-PROCESSOR SYSTEM AND MULTI-PROCESSOR SYSTEM HAVING KERNEL SUBSTITUTION FUNCTION

[75] Inventor: Masahiko Yoshimura, Yokohama, Japan

[73] Assignee: Kabushiki Kaisha Toshiba, Kawasaki, Japan

[21] Appl. No.: 443,773

[22] Filed: May 18, 1995

[30] Foreign Application Priority Data

May 19, 1994 [JP] Japan .................................. 6-105647

[51] Int. Cl.[6] ...................................................... G05B 9/02
[52] U.S. Cl. .................... 364/187; 366/138; 366/413.01; 366/413.02; 395/575; 395/650; 395/700
[58] Field of Search ..................................... 364/138, 187, 364/413.01, 413.02, 280; 395/725, 700, 575, 375, 250, 650; 380/4, 25, 49; 455/296, 306, 309, 305; 365/187, 138, 280, 413.01, 413.02

[56] References Cited

U.S. PATENT DOCUMENTS

| | | | |
|---|---|---|---|
| 5,109,515 | 4/1992 | Leggis et al. ............................ | 395/725 |
| 5,157,603 | 10/1992 | Scheller et al. ..................... | 364/413.01 |
| 5,274,811 | 12/1993 | Brog et al. .............................. | 395/700 |
| 5,388,215 | 2/1995 | Baker et al. ............................ | 395/200 |
| 5,390,329 | 2/1995 | Gaertner et al. ........................ | 395/650 |
| 5,452,452 | 9/1995 | Gaetner et al. ......................... | 395/650 |
| 5,481,719 | 1/1996 | Ackerman et al. ..................... | 395/700 |
| 5,499,399 | 3/1996 | Bond et al. .............................. | 455/296 |
| 5,515,538 | 5/1996 | Kleiman ................................. | 395/733 |
| 5,561,752 | 10/1996 | Jevans .................................... | 395/133 |
| 5,584,032 | 12/1996 | Hyatt ...................................... | 395/800 |
| 5,602,998 | 2/1997 | Alferness et al. ...................... | 395/566 |

*Primary Examiner*—Reba I. Elmore
*Assistant Examiner*—Ramesh Patel
*Attorney, Agent, or Firm*—Cushman Darby & Cushman IP Group of Pillsbury Madison & Sutro LLP

[57] ABSTRACT

At the time of starting to a kernel substitution, all processes executed on a first process are migrated to a second processor. Thereafter, a new kernel is loaded onto a main memory (substitution memory) set to be in a standby state in advance, and the first processor is rebooted based on the new kernel. Thereby, the new kernel can be applied to only the first processor. Thereafter, the process on the second processor operated based on a previous kernel is migrated to the first processor operated based on the new kernel. Thereafter, the second processor is rebooted based on the new kernel, and the main memory (substitution memory) is accessed, so that the first and second processors are operated based on the new kernel. As a result, a function of the new kernel can be applied to the multi-processor system. Therefore, the kernel can be substituted with a new one without stopping the operation of the system.

21 Claims, 5 Drawing Sheets

F I G. 1A

F I G. 1B

PROCESS QUEUE 133

| PROCESS | EXECUTION TIME | OWNER | STATUS | PROCESSOR | MEMORY (BYTE) | ADDRESS |
|---|---|---|---|---|---|---|
| #9 | 0:09:34 | SYSTEM | RUN | 110 | 7325 | E60A35 |
| #11 | 2:00:07 | USER | READY TO RUN | 120 | 560640 | FF0366 |
| #3 | 0:10:11 | SYSTEM | I/O WAIT | 110 | 58240 | F1A9BB |
| #4 | 0:02:03 | USER | SLEEP | | 8192 | C6ABB3 |
| #8 | 0:00:23 | USER | READY TO RUN | 110 | 333 | D89363 |

KERNEL SUBSTITUTION METHOD IN MULTI-PROCESSOR SYSTEM AND MULTI-PROCESSOR SYSTEM HAVING KERNEL SUBSTITUTION FUNCTION

BACKGROUND OF THE INVENTION

1. Field of the Invention

The present invention relates to a kernel substitution method in a multi-processor system having a plurality of processors and a multi-processor system having a kernel substitution function. More particularly, the present invention relates to a kernel substitution method in a system in which it is required that a system such as a fault tolerant system is always operated and no power-off is permitted, and a corresponding multi-processor system having a kernel substitution function.

2. Description of the Related Art

Generally, in a computer system, it is sometimes necessary to add a new function in a revision and provide processing for fixing a bug (debugging. For example, parameters, which are set in a kernel of the computer system, are changed so that the number of files to be dealt with by a user, the number of files to be dealt with by a process, and the number of files to be dealt with by an entire computer system can be changed. However, for changing the system capability, adding a new function, or debugging, it is necessary that a specific table be prepared, or a compilation be performed again, or the system be restarted.

For adjusting the computer system as described above, it is necessary to shut down and reboot the computer system so that the computer system is operated based on a changed or corrected kernel. In other words, a kernel, which is a base of the operation of the computer system must be substituted (kernel substitution).

Moreover, computer systems often include a system for processing major transactions and are fault tolerant so that the system continuously operates for 24 hours each day.

In important systems which process major transactions or in which interruptions are not allowed, the system is shut down during the limited time when processing is not executed. Alternatively, use of the system is first prohibited, and then the system is shut down to be rebooted to substitute the kernel.

In a fault tolerant system which must continuously operate, kernel substitution cannot be performed. Therefore, executing kernel substitution is incompatible with 24 hour per day continuous operation.

As mentioned above, in the computer system which requires kernel substitution, it is necessary that the operation of the computer system be stopped. Such a need causes a great impact on an important system such as the system which processes major transactions, the system for executing processing in which interruptions are not allowed, or the fault tolerant system, and the operations of these systems are largely limited by such a need.

SUMMARY OF THE INVENTION

An object of the present invention is to provide a multi-processor, which can substitute a kernel in an online state without stopping the multi-processor system.

According to a first aspect of the present invention, there is provided a multi-processor system comprising a plurality of processors operated based on a first kernel; one or more processes allocated to any one of processors among the plurality of processors; a second kernel; migrating means for allocating all processes allocated to a first processor of the plurality of processors to the other processor; rebooting means for rebooting the first processor whose process allocation is changed by the migrating means based on the second kernel; and controlling means for controlling the migrating means and the rebooting means in accordance with all processors.

According to a second aspect of the present invention, there is provided a multi-processor system comprising a plurality of processors; a first memory including a first kernel being as a base of the operation of the plurality of processors, one or more processes, and a process queue having process information showing to which processor of the plurality of processors the one or more processes is allocated; and a second memory including a second kernel, wherein the first kernel includes migrate control information for operating the first processor so as to rewrite the processor information such that all processes allocated to the first processor of the plurality of processors are allocated to the other processor; and the first memory includes reboot control information for operating the first processor whose allocation is changed to be rebooted based on the second kernel in accordance with the migrate control information, and kernel substitute information for controlling all plurality of processes to be operated based on the migrate control information and the reboot control information.

According to a third aspect of the present invention, there is provided a system substitution method of a multi-processor system having a plurality of processors operated based on a first kernel, one or more processes allocated to any one of processors, and a second kernel, comprising the steps of a) allocating all processes allocated to a first processor being one of the plurality of processors to the other processor; b) rebooting the first processor whose allocation is changed by the step a); and c) executing the steps a) and b) to all the plurality of processors.

According to the above system and method, all processes executed on the first processor are migrated to the other processor, that is, the second processors at the time when the kernel substitution is started. Thereafter, the new kernel is loaded onto the main memory (substitution memory), which is set to be in a standby state, and the first processor is rebooted based on the new kernel. Whereby, the new kernel can be applied to only the first processor. Thereafter, all processes on the second processor, which is operated based on the previous kernel, are migrated to the first processor, which is operated on the new kernel. Thereafter, the second processor is rebooted based on the new kernel, and the main memory (substitution memory) is accessed. Whereby, since the first and second processors are operated based on the new kernel, a new kernel function can be applied to the multi-processor system. Therefore, the kernel can be replaced with a new kernel without stopping the system operation.

Moreover, in a case where there is a defect in the new kernel, a system crash may be generated. The system is rebooted based on the original kernel so that the system is returned to the original state, and problems with the new kernel can be avoided.

As mentioned above, according to the present invention, in the multi-processor system, a kernel can be substituted with a new kernel online without stopping the operation of the system, eliminating the restriction of the system that no power-off is permitted can be reduced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Generally, a kernel of a computer system is defined as a minimum necessary function of OS (operating system), which is needed to operate the computer system. Therefore, in the computer system, the following two relationships exist between the kernel and OS as shown in FIGS. 1A and 1B.

Figure 1A:
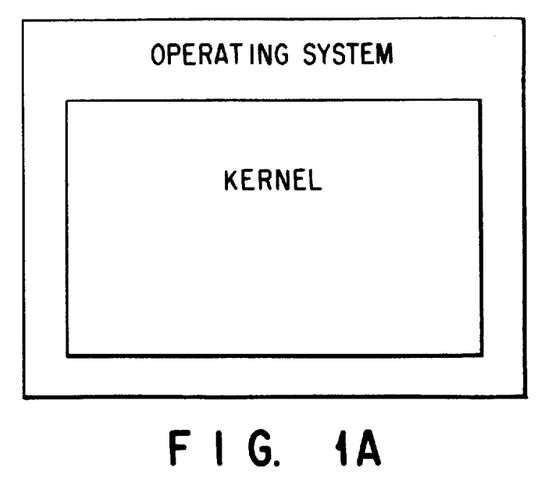
FIGS. 1A and 1B are views explaining a definition of kernel in a multi-processor system of the present invention.

More specifically, FIG. 1A shows a case in which the kernel and OS are equal to each other. FIG. 1B shows a case in which some other functions are included in OS in addition to the kernel. For example, there are a file managing system, a process managing system for managing execution of the process, and a memory managing system.

Figure 1B:
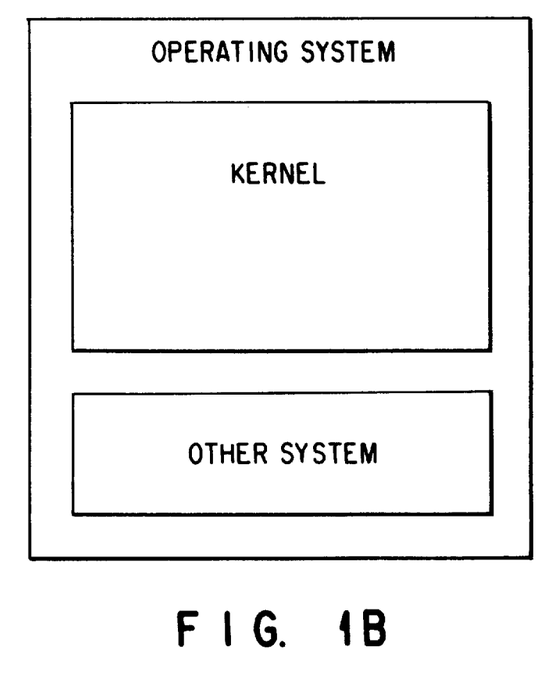

In the present invention, a kernel substitution processing is executed to substitute an OS including the kernel and the other functions when the kernel and OS have the relationship as shown in FIG. 1B.

Figure 2:
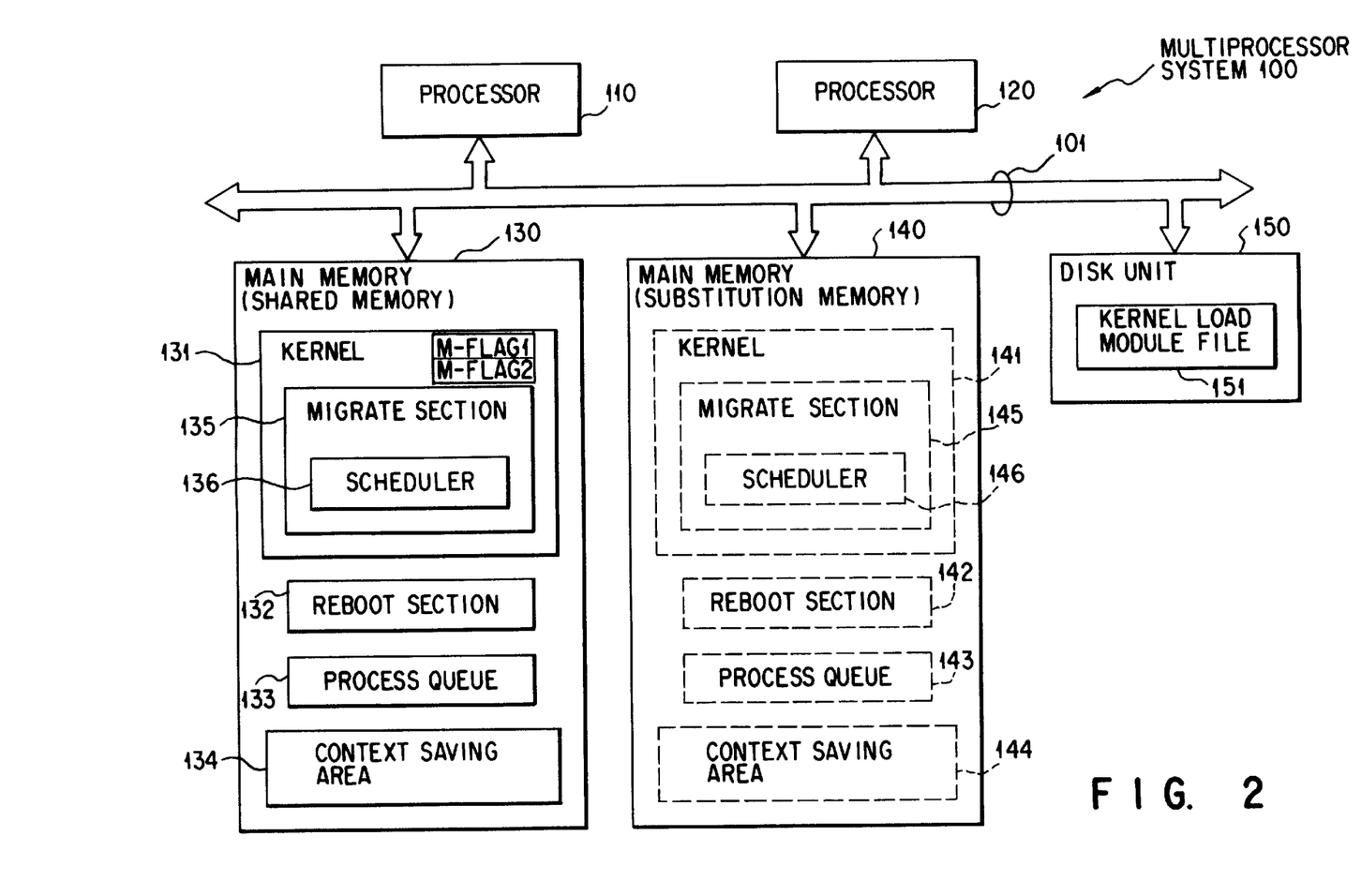
FIG. 2 is a block diagram explaining the system structure of the multi-processor system of the present invention.

FIG. 2 shows the structure of a multi-processor system 100 of the present invention. Two processors 110 and 120 are provided in the multi-processor system 100. The processors 110 and 120 exclusively access main memories 130 and 140, to be described later in accordance with the kernel. In other words, the processors 110 and 120 access either the main memory 130 or the main memory 140 in accordance with the kernel, which is the base of the control. In this embodiment, to simplify the explanation of kernel substitution, two processors are provided. However, the present invention can be applied to a multiprocessor system in which three or more processors are provided.

In the multi-processor system 100, the main memory 130, which is a common memory, the main memory 140, which is used to execute the kernel substitution, and a disk unit 150 are provided. These structural elements are connected through a system bus 101.

The main memory 130 is provided to correspond to the kernel of the system 100 and an address space of the process of the system 100. The main memory 130 comprises a kernel 131, a reboot section 132, a process queue 133, and a context save area 134. The kernel 131 is a base of the operation of the processors 110 and 120. The reboot section 132 is used to execute a reboot processing. The context save area 134 is used to temporarily retreat each process. The process queue 133 is used to store various data of the process to be allocated to the processors 110 and 120, that is, management information of the process, which is retreated to the context save area 134. In the kernel 131, there are provided a migrate section 135 and flags M-FLAG1 and M-FLAG2. The migrate section 135 is used to change allocation of the process in order that the process, which is executed by a certain processor, will be executed by the other processor. The flags M-FLAG1 and M-FLAG2 are set when the migrate processing is ended in accordance with the migrate section 135. In the migrate section 135, there is provided a scheduler 136 for executing the schedule of each process registered in the process queue 133.

The main memory 140 has the same memory capacity as a main memory 130, and is used to load a new kernel. The main memory 140 is in a standby state without being accessed by the processors 110 and 120 when the processors 110 and 120 are operated based on the kernel 131, which the main memory 130 stores.

A disk unit 150 is a secondary memory device for storing various files, which are used by the multiprocessor system. The disk unit 150 has a load module file including a program for substituting an old kernel with a new kernel.

Figure 3:
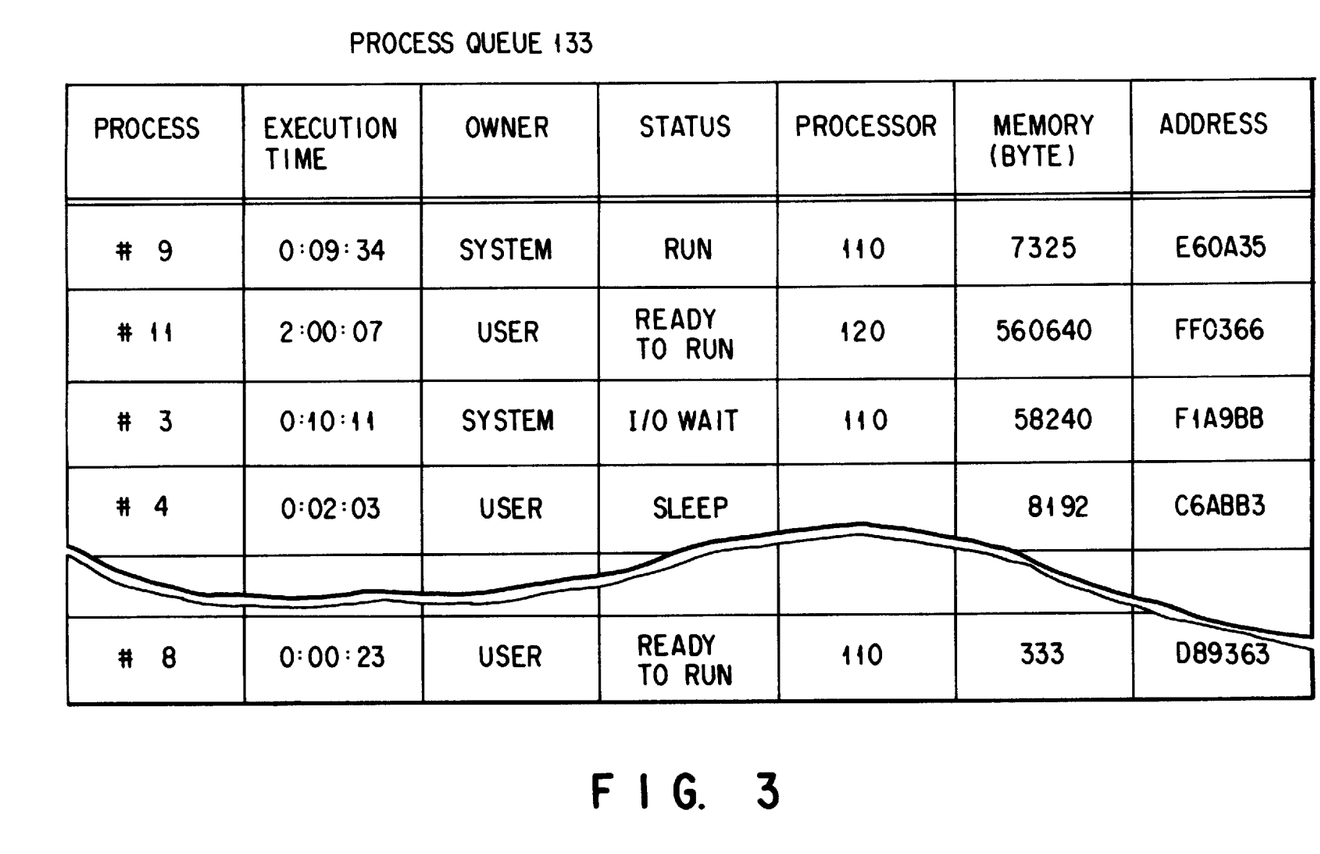
FIG. 3 is a view showing an example of a process queue in the multi-processor system of FIG. 2.

The following will explain management information of the process registered in the process queue 133 with reference to FIG. 3.

The process queue 133 has management information of each process stored in the context save area 134 as mentioned above. Managing data is queued for every process. Managing data includes execution time management information showing time, which is required to execute a process, owner management information showing by which instruction the process is executed, status management information showing a present state of the process to which processor data is allocated, processor management information showing to which processor data is allocated, memory capacity management information showing a memory capacity occupied by the process, and address management information showing an address stored in the context save area 134.

Execution time management information shows the time taken to execute the process, by hour, minute, and second. Execution time management information can be shown by a number of times of accessing to the disk unit 150. Owner management information shows that the process is executed in accordance with a request of the system or user's instruction.

System status management information shows a state of each process. The process states include a run state, a ready to run state, a sleep state, and an I/O wait state. The run state shows that the process is executing. The ready to run state shows that the process is ready to be processed by the processor. The sleep state shows a state waiting for the ready to run state when the processing by the processor cannot be continued. The I/O wait state shows a response wait from an I/O unit such as the disk unit 150. Processor management information shows to which processor data is allocated. Memory management information shows a memory capacity, which is occupied by the process, by a byte unit. Address management information shows a first address of the context stored in the context save area 134 to correspond to the process.

For example, a process #9 shown in FIG. 3 is executed in accordance with the request of the system, and the execution time is 9 min and 30 sec. Moreover, status management information is the run state, and processor management information shows the processor 110. Therefore, it is shown that the process #9 is now being executing by the processor 110. Moreover, it is shown that the memory capacity of the process #9 is 7325 bytes and that the first address of the context save area 134 is HE60A35.

Figure 4:
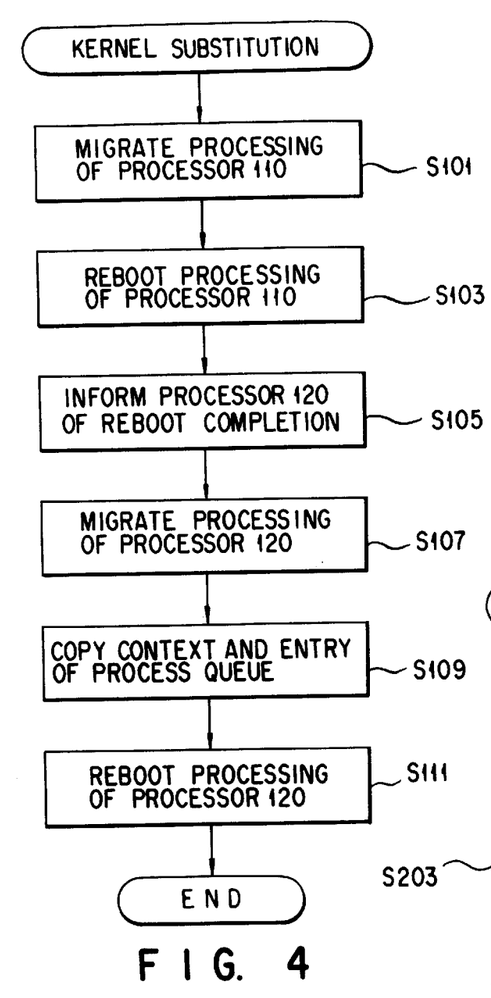
FIG. 4 is a flow chart explaining a kernel substitution processing in the multi-processor system of FIG. 2.
Figure 5:
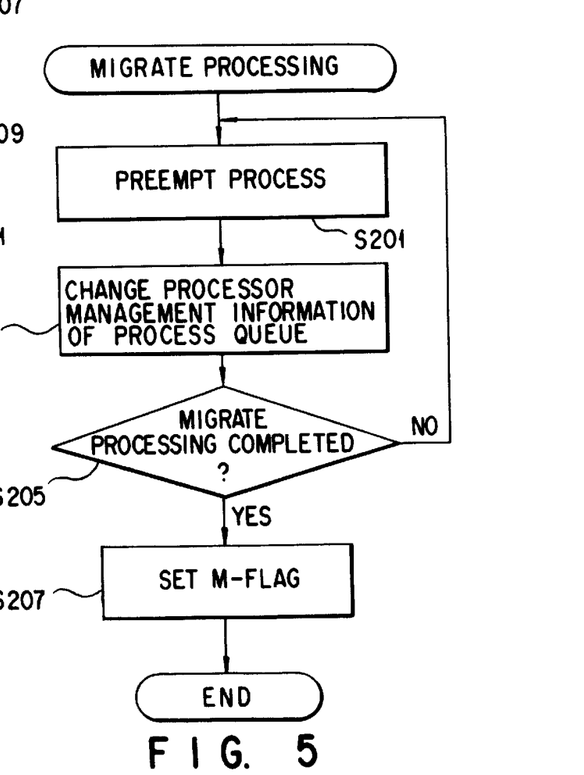
FIG. 5 is a flow chart explaining a migrate processing executed in the kernel substitution processing of FIG. 4.

The following will explain the kernel substitution processing of this embodiment with reference to FIGS. 4 and 5.

In the multi-processor system 100, it is assumed that the processors 110 and 120 are operated in accordance with the control of the kernel 131 loaded on the main memory 130 to execute various processes. Moreover, since the processors 110 and 120 are operated based on the kernel 131 stored in the main memory 130, the processors 1 10 and 120 access only the main memory 130, and they do not access the main memory 140.

Since the capability of the multi-processor system is changed, the new function is added in accordance with a revision, and the kernel 131 is debugged, the kernel load module file 151 is provided on the disk unit 150 in order to substitute the kernel 131 with a new kernel 141. Thereafter, if a command for instructing the execution of the kernel substitution processing is inputted through a keyboard (not shown) by a manager of the multi-processor 100, kernel substitution processing shown in FIG. 4 is executed in accordance with the input of the command.

In response to the input of the command, the processor 110 migrates the process, which is executed by the processor 110, to the processor 120 in accordance with the migrate section 135 (step S101 in FIG. 4). In other words, the processor 110 changes processor management information in order that the process allocated to the processor 110 allocated to the processor 120 in the process queue 133.

The migrate processing will be explained with reference to FIG. 5.

The processor 110 preempts the process #9, which is being executing, and saves the context, which corresponds to the process #9, in the context save area 134 (step S201 in FIG. 5). Then, status management information of the process #9 is set to the ready to run state, which shows an executable state on the memory, and processor management information is changed from the processor 110 to the processor 120. In other words, the process #9 is set to be in a state in which process #9 is not executed on the processor 110 (step S203). Normally, the scheduler 136 selects a registered process from the process queue 133, and the process is executed by the processor 110. However, after step S203, since processor management information is changed to the processor 120, the process #9 is not executed by the processor 110 in the scheduler 136 after the kernel substitution processing is started. In other words, by the processing of steps S201 and S203, the process #9 is not to be executed by the processor 110.

Next, the processor 110 checks whether or not processor management information for the processor 110 exists among processes registered in the process queue 133 in order to determine whether or not the migrate processing is ended (step S205). In other words, among the processes registered in the process queue 133, processor management information is checked to determine whether processes are allocated to the processor 110. Then, if processor management information is allocated to the processor 110, it is determined that migrate processing is not ended (No in step S205). For example, in FIG. 3, regarding the case in which processor management information exists for the processor 110, there is process #3 other than process #9. For changing the processor management information of process #3, processes of steps S201 and 203 are executed.

By such processing, when all processor management information of the processes registered in the process queue are changed to the processor 120, the processor 110 determines that the migrate processing is ended (Yes in step S205). Thereafter, the processor 110 sets flag M-FLAG1 showing that the processes registered in the process queue 133 and allocated to the processor 110 are changed to the processor 120, that is, the migrate processing from the processor 110 to the processor 120 is ended (step S207).

On the other hand, the scheduler 136 selects a process from the process queue 133 for which to set the processor 120 to be in an execution state. At this time, the scheduler 136 performs the process selection without discriminating by which process the process was registered in the process queue 133. As a result, all processes registered in the process queue 133 are executed by the processor 120.

As explained above, all processes executed on the processor 110 are migrated to the processor 120. The processor 110 loads the load module file 151 of the new kernel 141 stored in the disk unit 150 onto the main memory 140 in accordance with the setting of the flag M-FLAG1. Then, the processor 110 jumps to an entry point, so that a new kernel is executed and a reboot is performed (step S103 in FIG. 4). Whereby, the processor 110 is operated based on the new kernel 141. It is noted that the processor 110 is controlled to access only the main memory 140 after the reboot. Moreover, the processor 120 accesses only the main memory 130, and is operated based on the original kernel 131. When the processor 110 ends the reboot processing, the processor 110 resets the flag M-FLAG1, and informs the processor 120 of reboot completion (step S105).

The processor 120 migrates all processes on the processor 120 to the processor 110 based on the migrate section 135 in accordance with the information of the reboot processing completion of the processor 110 (step S107). In other words, the processor 120 executes the processing using the processor management information of all processes registered in the process queue 133 in accordance with the migrate processing of FIG. 5. Since the migrate of the processor 120 is substantially the same as that of the processor 110, the specific explanation is omitted. By the migrate processing of the processor 120, a flag M-FLAG2 is set to the kernel 131 of the main memory 130. The processor 120 exceptionally accesses the main memories 130 and 140 in accordance with the setting of the flag M-FLAG2. Then, the processor 120 registers the context saved in the context save area 134 to the context save area 144 to correspond to each process registered in the process queue 133. Further, the processor 120 registers all processes registered in the process queue 133 to a process queue 143 (step S109). Whereby, if the processor 120 reboots based on the new kernel 141, the processors 110 and 120 does not need to refer to the process queue 133 and the context save area 134. In other words, there is no need that the processors 110 and 120 access the main memory 130.

The processor 120 performs the reboot processing in accordance with a reboot section 132 when a copy of the process queue 133 and that of the context save area 134 are completed. Then, the new kernel 141 on the main memory 140 is obtained (step S111). Whereby, the processors 110 and 120 access only the main memory 140, and are operated based on the new kernel. Therefore, all processes, which have been processed based on the previous kernel 131, are processed based on the new kernel 141.

By the above-mentioned processing, the kernel substitution process is completed. However, after step S111, processor management information of all processes registered in the process queue 143 shows the processor 110. Then, processor management information may be changed such that the loads of the processors 110 and 120 are the same.

Moreover, the main memory 130 may be set to the standby state without being used in order to prepare a next kernel substitution. By replacing the main memories 130 and 140 with each other in the above-mentioned processing, the next kernel substitution can execute the same processing.

In the above-mentioned embodiment, if it is ascertained that the new kernel is defective, the previous kernel is left in the main memory 130 so that the previous kernel can be restored to the processor. In a case in which the system executing the new kernel crashes, the system is rebooted based on the previous kernel in the main memory 130, so that the system can be recovered.

As mentioned above, at the time when the main memory 140 is prepared for a new kernel in advance so as to start the kernel substitution, all processes executed on the processor 110 are migrated to the other processor, that is, the processor 120. Thereafter, the new kernel 141 is loaded onto the main memory 140, which is set to be in the standby state in advance, and the processor 110 is rebooted based on the new kernel 141. Whereby, the new kernel 141 can be applied to only the processor 110. Thereafter, the processes on the processor 120, operating based on the previous kernel, are migrated to the processor 110, which is operating based on the new kernel. Thereafter, the processor 120 is rebooted based on the new kernel 141, and the main memory 140 is accessed, so that the processors 110 and 120 are operating based on the new kernel. Due to this, a new kernel function can be applied to the multi-processor system. Therefore, the kernel can be substituted with the new kernel without stopping the system operation.

Figure 6:
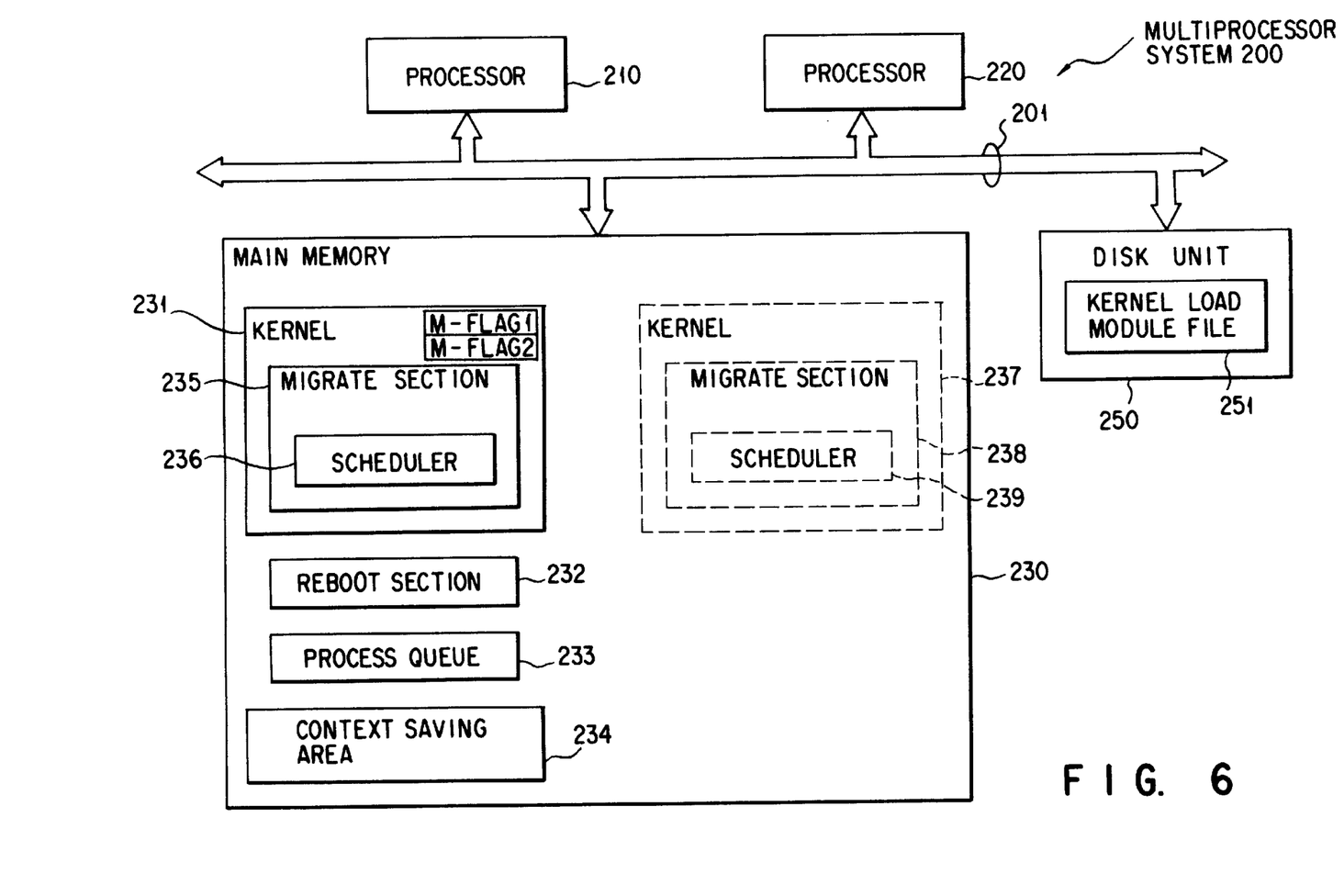
FIG. 6 is a block diagram showing a modification of the multi-processor system of the present invention.

The following will explain a modification of the above-embodiment with reference to FIG. 6.

A multi-processor system 200 of FIG. 6 comprises two processors 210 and 220, a main memory 230, and a disk unit 250. The respective structural elements are connected to each other through a system bus 201. The main memory 230 comprises a kernel 231, a reboot section 232, a process queue 233, and a context save area 234. The kernel 231 is a base of the operation of the processors 210 and 220. The reboot section 232 is used to execute a reboot processing. The context save area 234 is used to temporarily retreat each process. The process queue 233 is used to store various data of the processes to be allocated to the processors 210 and 220, that is, management information of the processes, which are retreated to the context save area 234. In the kernel 231, there are provided a migrate section 235 and flags M-FLAG1 and M-FLAG2. The migrate section 235 is used to change the allocation of the processes in order that the processes, which are to be executed by a certain processor, will be executed by the other processor. The flags M-FLAG1 and M-FLAG2 are set when the migrate processing is ended in accordance with the migrate section 235. In the migrate section 235, there is provided a scheduler 236 for executing the schedule of each process registered in the process queue 233. A disk unit 250 is a secondary memory device for storing various files, which are dealt by the multi-processor system. The disk unit 250 has a load module file including a program for substituting an old kernel with a new kernel.

In the multi-processor system 200 of this modification, the kernel substitution processing is executed in substantially the same way as the kernel substitution processing of the above-mentioned embodiment. However, a new kernel 237 is loaded onto the same memory where the previous kernel 231 is stored. Therefore, the copy processing of the process queue 233 and the context save area 234 becomes unnecessary.

On the other hand, the processors 210 and 220, which are rebooted based on the new kernel 237, need to be controlled not to access the kernel 231 stored in the same main memory 230.

As mentioned above, according to the present invention, in the multi-processor system, since a kernel can be substituted with a new kernel online without stopping the operation of the system, the restriction of the system that no power-off is permitted can be reduced.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

I claim:

1. A multi-processor system comprising:

a plurality of processors initially operating based on a first kernel;

one or more processes allocated to any of the processors among said plurality of processors;

a second kernel;

migrating means for allocating all processes allocated to a first processor of said plurality of processors to another processor;

rebooting means for rebooting said first processor having a process allocation changed by said migrating means based on said second kernel; and means for causing said migrating means and said rebooting means to operate for all of said processors operating based on said first kernel.

2. The multi-processor system according to claim 1, wherein said migrating means is included in said first kernel.

3. The multi-processor system according to claim 1, further comprising:

a memory for storing allocation information showing one processor of the plurality of processors allocated to at least one process; and a scheduler for executing said at least one process by said one processor in accordance with said allocation information stored in said memory;

said migrating means including rewriting means for rewriting allocation information stored in said memory.

4. The multi-processor system according to claim 1, wherein:

said migrating means includes means for setting a flag in accordance with completion of processing for allocating all of said processes allocated to said first processor to said another processor, and said rebooting means reboots in response to said flag being set.

5. The multi-processor system according to claim 1, further comprising:

second migrating means for allocating all processes allocated to a second processor of said plurality of processors which are operating based on said second kernel to a processor other than said second processor;

second rebooting means for rebooting said second processor having a process allocation changed by said second migrating means based on said first kernel; and means for causing said second migrating means and said second rebooting means to operate for all processors operating based on said second kernel.

6. The multi-processor system according to claim 1, wherein said first kernel and said second kernel have a function equal to an operating system (OS) being as a basic operation of said multi-processor system.

7. A multi-processor system comprising:

a plurality of processors;

a first memory including:
   a first kernel being a base of an operation of said plurality of processors,
   one or more processes, and
   a process queue having process information showing to which processor of said plurality of processors said one or more processes is allocated; and a second memory including a second kernel;

wherein:
   said first kernel includes migrate control information for operating a first processor of said plurality of processors so as to rewrite said process information such that all processes allocated to the first processor are allocated to another processor, and
   said first memory includes:
      reboot control information for operating said first processor having a process allocation changed to be rebooted based on said second kernel in accordance with said migrate control information, and
      kernel substitute information for controlling all of said one or more processes to be operated based on said migrate control information and said reboot control information.

8. The multi-processor system according to claim 7, wherein said migrate control information includes a scheduler for executing said one or more processes by said plurality of processors in accordance with said process information stored in said process queue.

9. The multi-processor system according to claim 7, wherein said migrate control information sets a predetermined flag when said process information is rewritten by said first processor, and said reboot control information operates said first processor in response to said predetermined flag being set.

10. The multi-processor system according to claim 7, wherein:

said second kernel includes second migrate control information for operating a second processor of the plurality of processors so as to rewrite said process information such that all processes allocated to the second processor are allocated to said another processor when said plurality of processors are operated based on said second kernel, said second memory includes:
   second reboot control information for operating said second processor having a process allocation changed to be rebooted based on said first kernel in accordance with said second migrate control information, and
   second kernel substitute information for controlling all processes to be operated based on said second migrate control information and said reboot control information.

11. The multi-processor system according to claim 7, wherein said first kernel and said second kernel have a function equal to an operating system (OS) being as a basic operation of said multi-processor system.

12. A system substitution method of a multi-processor system having a plurality of processors operated based on a first kernel, one or more processes allocated to an arbitrary processor of said plurality of processors, and a second kernel, comprising steps of:

a) allocating all processes allocated to said arbitrary processor to another processor;

b) rebooting said arbitrary processor having a process allocation changed by said allocating step a); and c) causing said allocating and rebooting steps a) and b) to be performed on all remaining processors of said plurality of processors successively.

13. The system substitution method according to claim 12, wherein:

said multi-processor system comprises a memory for storing allocation information showing a processor of said plurality of processors allocated to one or more processes, and a scheduler for executing one or more processes by said plurality of processors in accordance with said allocation information stored in said memory, and said allocating step a) further includes a step of rewriting said allocation information stored in said memory.

14. The system substitution method according to claim 12, wherein said allocating step a) further includes a step of setting a predetermined flag in accordance with completion of the step of allocating said all processes allocated to said arbitrary processor to the other process, and said rebooting step b) reboots in response to said predetermined flag being set.

15. The system substitution method according to claim 12, further comprising steps of:

d) allocating all processes allocated to said arbitrary processor of said plurality of processors to said another processor when said plurality of processors are operated based on said second kernel;

e) rebooting said arbitrary processor having a process allocation changed by said allocating step d) based on said first kernel; and f) causing said allocating step d) and said rebooting step e) to operate for all remaining processors operating based on said second kernel successively.

16. The method according to claim 12, wherein said first kernel and said second kernel have a function equal to an operating system (OS) being as a basic operation of said multi-processor system.

17. A multi-processor system comprising:

a plurality of processors; and a main memory including:
   a first kernel being a base of an operation of said plurality of processors,
   a second kernel,
   one or more processes,
   a process queue having process information showing to which processor of said plurality of processors one or more processes is allocated,
   wherein:
      said first kernel includes:
         migrate control information for operating a first processor of said plurality of processors so as to rewrite said process information such that all processes allocated to the first processor are allocated to another processor, reboot control information for operating said first processor having a process allocation changed to be rebooted based on said second kernel in accordance with said migrate control information, and kernel substitute information for controlling all processes of said one or more processes based on said migrate control information and said reboot control information.

18. The multi-processor system according to claim 17, wherein said migrate control information includes a scheduler for executing said one or more processes by said plurality of processors in accordance with said process information stored in said process queue.

19. The multi-processor system according to claim 17, wherein said migrate control information sets a predetermined flag when said process information is rewritten by said first processor, and said reboot control information operates said first processor in response to said predetermined flag being set.

20. The multi-processor system according to claim 17, wherein said second kernel includes second migrate control information for operating a second processor of the plurality of processors to rewrite said process information such that all processes allocate to the second processor are allocated to the other processor when said plurality of processors are operated based on said second kernel.

21. The multi-processor system according to claim 17, wherein said first kernel and said second kernel have a function equal to an operating system (OS) being as a basic operation of said multi-processor system.

* * * * *